US009816631B1

(12) United States Patent
Lin et al.

(10) Patent No.: US 9,816,631 B1
(45) Date of Patent: Nov. 14, 2017

(54) DECOMPRESSION AIR VALVE

(71) Applicant: Intex Marketing Ltd., Tortola (VG)

(72) Inventors: Hua Hsiang Lin, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 15/593,718

(22) Filed: May 12, 2017

(30) Foreign Application Priority Data

May 12, 2016 (CN) .......................... 201610316878.5

(51) Int. Cl.
*F16K 15/20* (2006.01)
*F16K 17/04* (2006.01)
*F16K 17/168* (2006.01)
*B60C 29/06* (2006.01)

(52) U.S. Cl.
CPC ............ *F16K 15/207* (2013.01); *F16K 17/04* (2013.01); *F16K 17/044* (2013.01); *F16K 17/168* (2013.01); *B60C 29/068* (2013.01); *Y10T 137/3646* (2015.04)

(58) Field of Classification Search
CPC .... F16K 15/207; F16K 17/04; F16K 17/0433; F16K 17/044; F16K 17/168; Y10T 137/3584; Y10T 137/36; Y10T 137/3631; Y10T 137/3646; Y10T 137/374; B60C 29/068
See application file for complete search history.

(56) References Cited

U.S. PATENT DOCUMENTS

| | | | | |
|---|---|---|---|---|
| 1,732,918 | A | * 10/1929 | Sutton .................... | F16K 15/207 137/230 |
| 2,323,237 | A | * 6/1943 | Payne .................... | F16K 15/207 137/226 |
| 2,510,192 | A | * 6/1950 | Payne .................... | F16K 15/207 137/226 |
| 2,954,796 | A | * 10/1960 | Marshall ............... | F16K 15/207 137/226 |
| 3,108,610 | A | 10/1963 | De See | |
| 3,429,330 | A | * 2/1969 | Bogossian ............. | F16K 15/20 137/223 |
| 5,957,151 | A | 9/1999 | Dalcourt et al. | |
| 5,971,016 | A | 10/1999 | Wass et al. | |
| 6,089,251 | A | * 7/2000 | Pestel ..................... | B63C 9/24 137/232 |
| 7,021,326 | B2 | 4/2006 | Rogier | |
| 7,146,923 | B2 | 12/2006 | Polley et al. | |
| 7,171,977 | B2 | 2/2007 | Wass et al. | |
| 7,275,494 | B2 | 10/2007 | Polley et al. | |
| 7,438,081 | B1 | 10/2008 | Chen | |
| 7,509,969 | B2 | 3/2009 | Huang | |
| 7,624,752 | B2 | 12/2009 | Haung | |

(Continued)

FOREIGN PATENT DOCUMENTS

GB          2215057        9/1989

*Primary Examiner* — Marina Tietjen
*Assistant Examiner* — Richard K Durden
(74) *Attorney, Agent, or Firm* — Faegre Baker Daniels LLP

(57) ABSTRACT

A valve assembly configured for use with an inflatable product, such as a mattress, chair, pool, spa, float, or another suitable inflatable product. The valve assembly includes a first valve component that serves as an opening for inflation and/or deflation of the inflatable product, and a second valve component that serves as an opening for deflation or decompression of the inflatable product.

25 Claims, 8 Drawing Sheets

(56) References Cited

U.S. PATENT DOCUMENTS

| | | |
|---|---|---|
| 8,256,447 B2 | 9/2012 | Badstue et al. |
| 8,387,650 B1 | 3/2013 | Hong |
| 2008/0047613 A1 | 2/2008 | Huang |
| 2012/0048392 A1 | 3/2012 | Song et al. |

* cited by examiner

DECOMPRESSION AIR VALVE

CROSS REFERENCE TO RELATED APPLICATION

This application claims priority to Chinese Application Serial No. 201610316878.5, filed May 12, 2016, the disclosure of which is hereby expressly incorporated by reference herein in its entirety.

FIELD OF THE DISCLOSURE

The present disclosure relates to a valve for use with an inflatable product. More particularly, the present disclosure relates to a combined inflation and decompression valve for use with an inflatable product, and to a method for using the same.

BACKGROUND OF THE DISCLOSURE

Traditional air valve assemblies of the type for use with inflatable products (such as mattresses, chairs, pools, spas, floats, etc.) include fill valve components. However, such conventional air valve assemblies typically do not provide for an automatic decompressing function, such that when the product is over inflated, air in the air chamber cannot exhaust out. As a result, if the internal portion of the product is in an over inflated state (i.e., has an internal pressure greater than a decompression value), and if the product is pressed by sufficient external force, it may burst or explode.

Prior attempts to combine an air valve and a decompression valve, have resulted in a simple decompression function as the internal portion of the product is over inflated. However, when the decompression valve is open to deflate, it does not automatically close in response to a reduction of air pressure. Additionally, the internal components of the decompression valve may shake or rattle as a result of air flowing when open, and thus may tend to break.

SUMMARY OF THE DISCLOSURE

The present disclosure provides a valve assembly configured for use with an inflatable product, such as a mattress, chair, pool, spa, float, or another suitable inflatable product. The valve assembly includes a first valve component that serves as an air inlet for inflation of inflatable product, and a second valve component that serves as an air outlet for deflation or decompression of inflatable product.

According to an embodiment of the present disclosure, an air valve assembly includes an air valve component and a decompression valve component. The air valve component includes an outer body defining an internal receiving chamber, and an air valve in fluid communication with the internal receiving chamber, the outer body including an air hole fluidly connecting the internal receiving chamber and an air chamber of an inflatable product. The decompression valve component is received within the internal receiving chamber and supported for longitudinal movement within the internal receiving chamber between a sealed state and an open state. The decompression valve component seals the air valve of the air valve component from the air hole of the outer body in the sealed state. The decompression valve component fluidly connects the air valve of the air valve component and the air hole of the outer body in the open state. The decompression valve component includes a decompression passage fluidly connecting the air chamber and atmosphere. A sealing portion is configured to close the decompression passage in the sealed state, and a limit portion is operably coupled with the sealing portion. When air pressure within the internal receiving chamber is greater than a decompression value, the sealing portion and the limit portion move relative to each other, and the sealing portion abuts the limit portion to move the decompression valve component from the sealed state to the open state.

According to another embodiment of the present disclosure, an air valve assembly includes an outer body defining an internal receiving chamber and having a plurality of air holes fluidly coupling the internal receiving chamber and an air chamber of an inflatable product. An air outlet is supported by the body and is configured to provide selective communication between the air chamber and atmosphere. An air valve device is supported by the outer body and fluidly coupled to the air chamber through the air holes of the outer body and the internal receiving chamber. The air valve device includes a valve rod and a seal supported by the valve rod, the valve rod being movable between a sealed state and an open state. The seal cooperates with the outer body to block air flow in the sealed state, and the seal is in spaced relation to the outer body to define a passageway between the seal and the outer body in the open state. The valve rod is biased toward the sealed state. A decompression valve device is supported by the outer body and is fluidly coupled to the air chamber through the air holes of the outer body and the internal receiving chamber. The decompression valve device includes a valve base received within the internal receiving chamber, the valve base defining an internal chamber extending between a first end and a second end. The first end of the valve base includes a decompression opening in fluid communication with the air outlet, and the second end of the valve base is fluidly coupled to the air chamber through the air holes of the outer body and the internal receiving chamber. A valve body and a seal are supported within the internal chamber of the valve base. The valve body is supported for movement relative to the seal between a sealed state and an open state. Air pressure inside the air chamber less than or equal to a decompression value causes the valve body and the seal to be in the sealed state where air flow is blocked through the decompression opening. Air pressure inside the air chamber greater than a decompression value causes the valve body and seal to be in the open state where air flow is permitted through the decompression opening.

According to yet another embodiment of the present disclosure, an air valve assembly includes an outer body defining an internal receiving chamber and having a plurality of air holes fluidly coupling the internal receiving chamber and an air chamber of an inflatable product. An air outlet is supported by the body and is configured to provide selective communication between the air chamber and atmosphere. An air valve device is supported by the outer body and is fluidly coupled to the air chamber through the air holes of the outer body and the internal receiving chamber. The air valve device includes a seal movable between a sealed state and an open state. The seal cooperates with the outer body to block air flow in the sealed state, and the seal is in spaced relation to the outer body to define a passageway between the seal and the outer body in the open state. A decompression valve device is supported by the outer body and is fluidly coupled to the air chamber through the air holes of the outer body and the internal receiving chamber. A decompression valve device is supported by the outer body and is fluidly coupled to the air chamber through the air holes of the outer body and the internal receiving chamber. The decompression valve device includes a valve base received within the internal receiving chamber, the valve base defining an internal chamber extending between a first end and a second end, the first end including an upper wall having a decompression opening in fluid communication with the air outlet, and the second end fluidly coupled to the air chamber through the air holes of the outer body and the internal receiving chamber. A valve body is supported within the internal chamber of the valve base, the valve body including an upper wall having a valve body opening in fluid communication with the decompression opening. A valve spool and a valve body seal are operably coupled to the valve body, the valve body seal supported by the valve spool and configured to selectively block the valve body opening. A valve body spring is received within the internal chamber of the valve base and biases the valve body away from the upper wall of the valve base and toward the valve body seal. The valve body is supported for movement relative to the valve body seal between a sealed state and an open state. A valve spool spring biases the seal toward the valve body opening. A limit portion is operably coupled with the seal, wherein air pressure inside the air chamber less than or equal to a decompression value causes the valve body and the valve body seal to be in the sealed state where air flow is blocked through the valve body opening and the decompression opening. Air pressure inside the air chamber greater than a decompression value causes the valve body seal to abut the limit portion and move the valve body relative to the valve body seal from the sealed state to the open state where air flow is permitted through the valve body opening and the decompression opening.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 3:
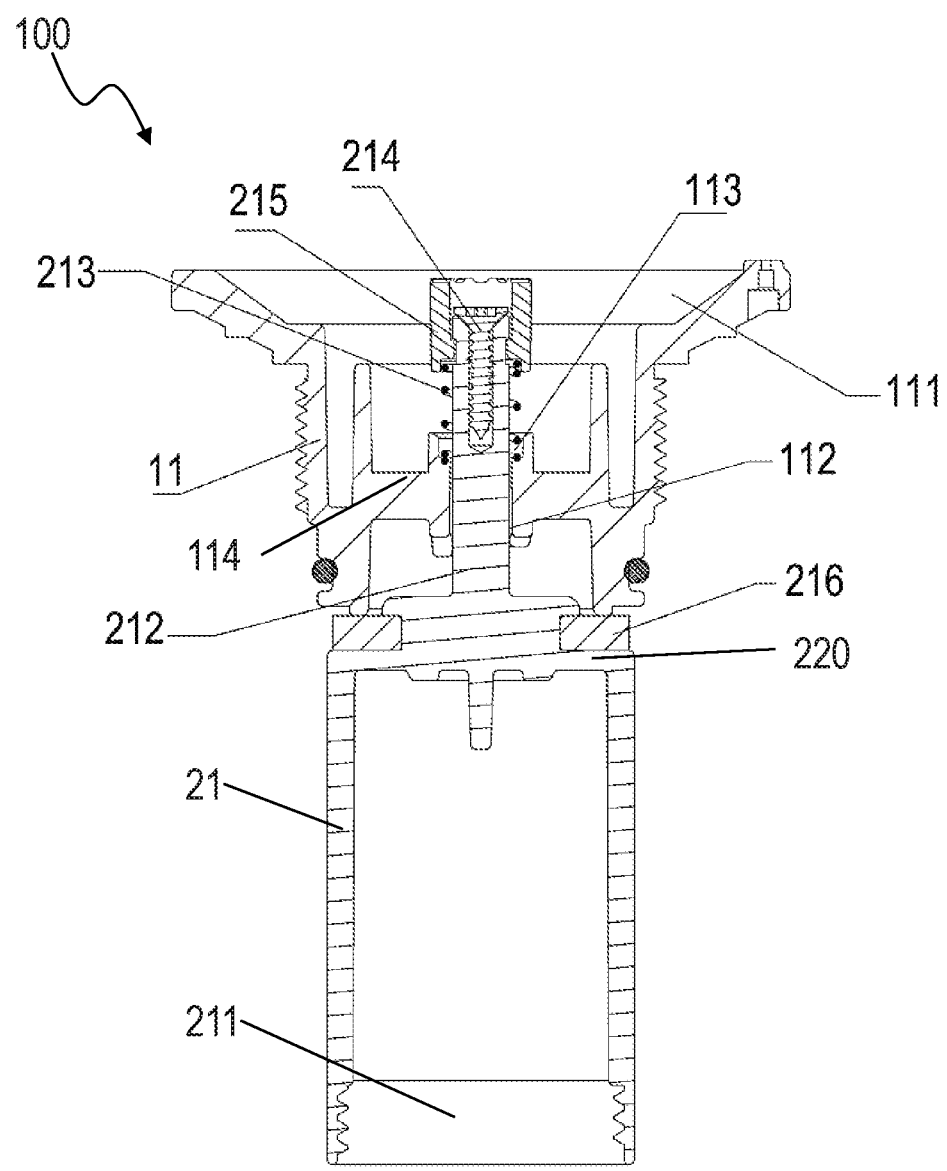
FIG. 3 is a longitudinal cross-sectional view of the air valve component of the air valve assembly of FIG. 1.
Figure 4:
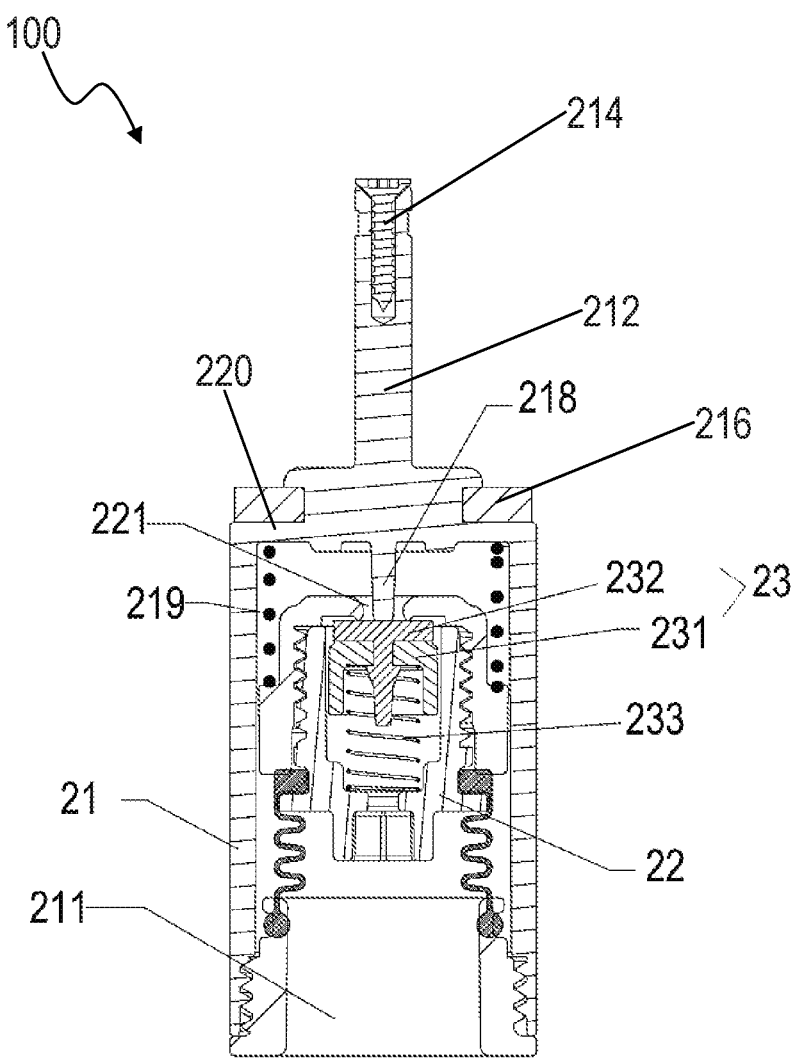
FIG. 4 is a longitudinal cross-sectional view of the decompression valve component of the air valve assembly of FIG. 1.
Figure 5:
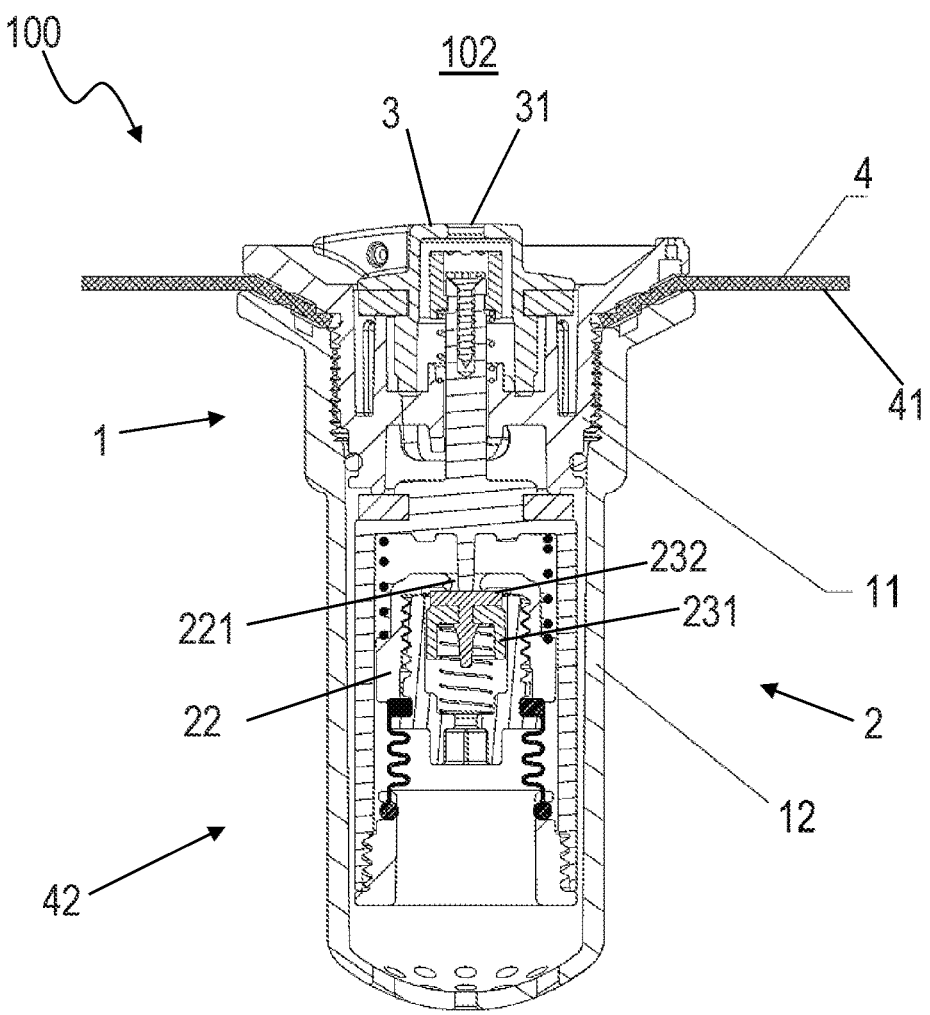
FIG. 5 is a longitudinal cross-sectional view of the air valve assembly of FIG. 1, showing an external wall of the air chamber sealingly coupled to the outer body.

An illustrative decompression air valve assembly 100 of the present disclosure is shown in FIGS. 1-5. With reference to FIG. 5, air valve assembly 100 is configured for use with an inflatable product 4, such as a mattress, chair, pool, spa, float, or another suitable inflatable product. Inflatable product 4 may include an external or outer wall 41 that defines one or more air chambers 42. Valve assembly 100 includes a first or fill/deflation air valve component or device 1 that serves as an air inlet for inflation/deflation of inflatable product 4, and a second or decompression valve component or device 2 that serves as an air outlet for deflation or decompression of inflatable product 4 by venting to atmosphere 102.

Figure 1:
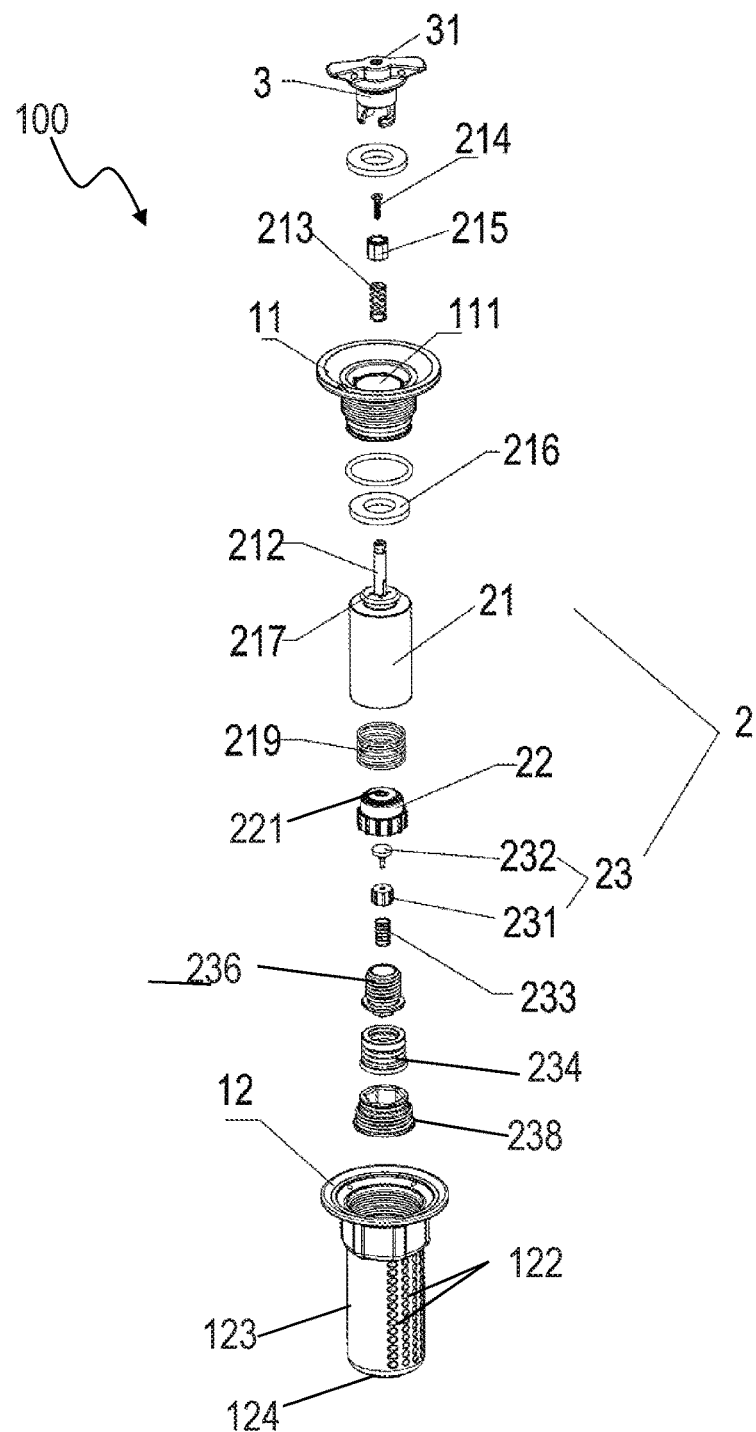
FIG. 1 is an exploded perspective view of an illustrative valve assembly of the present disclosure, including an air valve component and a decompression valve component.
Figure 2:
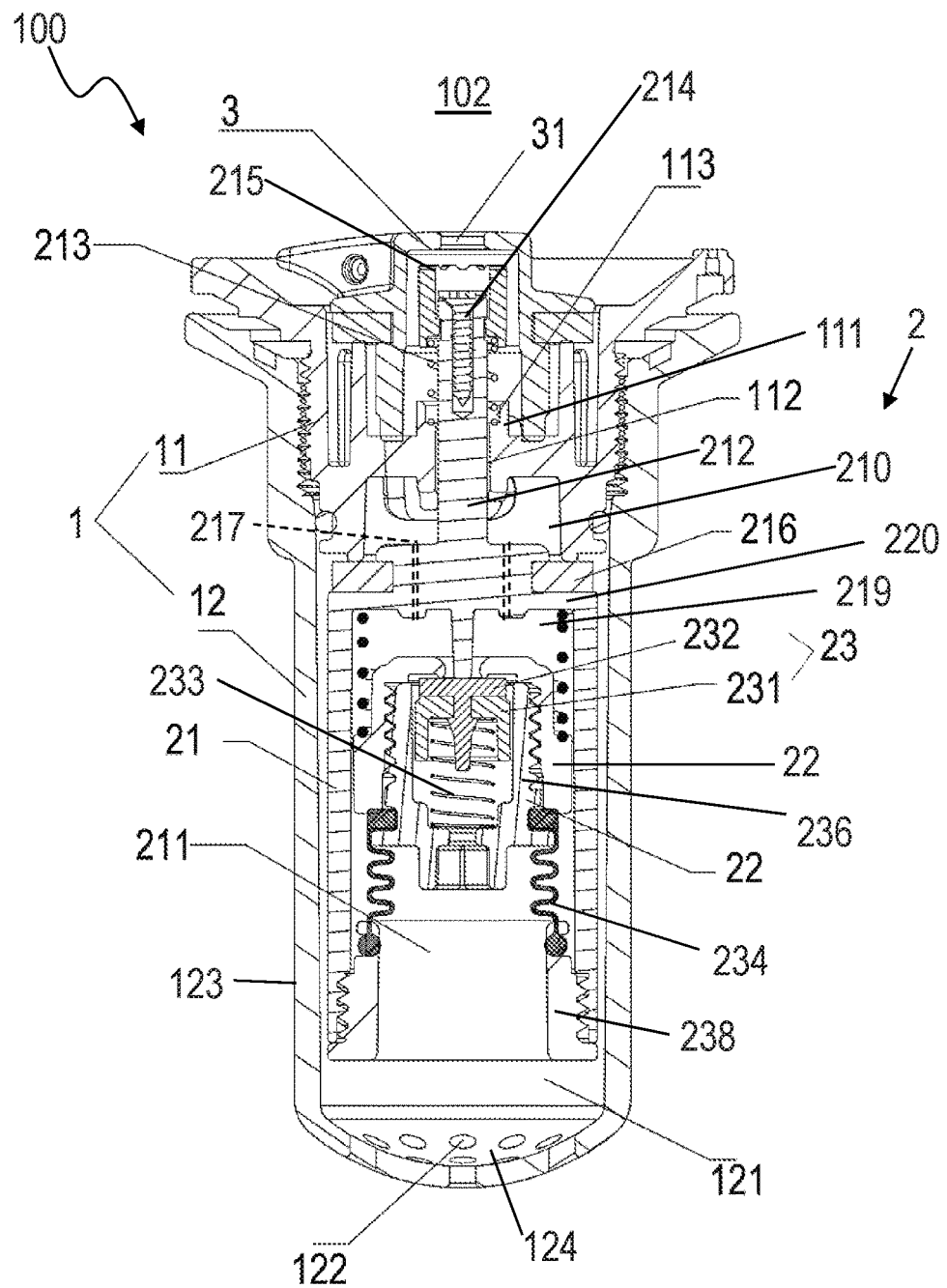
FIG. 2 is a longitudinal cross-sectional view of the air valve assembly of FIG. 1.

With further reference to FIGS. 1-4, the air valve component 1 of the valve assembly 100 illustratively includes an outer body defined by an upper body 11 and a lower body 12. In the illustrated embodiment of FIG. 2, upper body 11 is threadably coupled to lower body 12. Upper body 11 includes an air valve 111. As shown in FIG. 3, upper body 11 also includes one or more internal ribs 114 that define an internal passageway 112, and a groove 113 surrounding internal passageway 112. As shown in FIG. 2, lower body 12 defines an internal accommodating or receiving chamber 121 and one or more air holes 122 in the side wall 123 and/or the bottom wall 124 of lower body 12 that allow air to pass through lower body 12 between internal receiving chamber 121 of lower body 12 and air chamber 42 of inflatable product 4 (FIG. 5).

As shown in FIG. 2, the second or decompression valve component 2 includes a decompression passage 210 selectively connecting the air chamber 42 to atmosphere 102. More particularly, the decompression valve component 2 is received in the internal chamber 121 of lower body 12 and is configured to selectively close the decompression passage 210. The second valve component 2 includes a sealing portion having a valve base 21, a valve body 22, and a valve spool component 23. The valve base 21 includes an internal chamber 211 that is aligned with and fluidly communicates with internal receiving chamber 121 and air holes 122 of lower body 12 and hence with air chamber 42.

As shown in FIG. 3, a valve rod 212 extends upward from valve base 21 through internal passageway 112 of upper body 11 and away from internal chamber 211. A valve spring 213 is disposed around valve rod 212. A lower end of valve spring 213 is retained by being received in groove 113 of upper body 11, and an upper end of valve spring 213 is retained by being received beneath a screw 214 and a nut 215. Under the force of valve spring 213, nut 215 of the second valve component 2 is biased upward relative to upper body 11. A seal 216 (e.g., an O-ring) may be provided around valve rod 212 between the upper end of valve base 21 and the lower end of upper body 11.

The first air valve component 1 may have a normally sealed state or position and an open state or portion. In the sealed state, valve spring 213 lifts valve base 21 and seal 216 upward and into sealed engagement with upper body 11. In this sealed state, seal 216 blocks communication between air valve 111 in upper body 11 and internal chamber 121 in lower body 12. In the open state, a user manually presses nut 215 downward to compress valve spring 213. Valve base 21 and seal 216 also move downward and away from upper body 11 to define a passageway between the valve base 21 and the upper body 11, which places air valve 111 in upper body 11 in fluid communication with internal chamber 121 in lower body 12. The second valve component 2 may be placed in the open state when inflating or deflating the air chamber 42 of the inflatable product 4 (FIG. 5).

Valve body 22 and valve spool component 23 are received in internal chamber 211 of valve base 21, as shown in FIG. 4. With reference to FIGS. 1 and 2, the upper end of internal chamber 211 is in fluid communication with one or more one-way decompression holes 217 supported by a lateral upper wall 220 of the valve base 21, and the lower end of internal chamber 211 is in fluid communication with the internal receiving chamber 121 and the air holes 122 of the lower body 12. Valve body 22 defines a valve body opening or hole 221 in its upper end. Valve spool component 23 includes a valve spool 231 and a sealing element or seal 232 positioned between an upper surface of valve spool 231 and a lower surface of valve body 22 near hole 221. A limit portion or projection, such as a post or thimble 218, extends downwardly from valve base 21 into internal chamber 211, through hole 221, and toward valve spool component 23. A first, or valve body spring 219 is positioned in internal chamber 211 of valve base 21. An upper end of spring 219 abuts the upper wall 220 of the valve base 21, and a lower end of spring 219 abuts the valve body 22.

A second, or valve spool spring 233 is illustratively positioned between valve body 22 and valve spool component 23. A flexible bellows 234 is received within the internal chamber 211 of the valve base 21 and includes a first end coupled to the valve body 22 through a retainer 236. An end cap 238 is threadably coupled to the second end of the valve base 21. A second end of the bellows 234 is coupled to the end cap 238, such that the bellows 234 extends and retracts in response to longitudinal movement of the valve body 22 within the internal chamber 211 of the valve base 21.

With reference to FIGS. 1, 4 and 5, the second valve component 2 may have a normally sealed state or position and an open state or position. In the sealed state of the second valve component 2, the pressure inside the air chamber 42 of the inflatable product 4 (FIG. 5) forces valve spool 231 and seal 232 upward and into sealed engagement with valve body 22. In this state, seal 232 closes hole 221 to block airflow through internal chamber 211 of valve base 21.

When air pressure in the air chamber 42 of the inflatable product 4 is lower than a decompression value, the valve body 22 resets under the action of the valve body spring 219. More particularly, the valve body spring 219 pushes downwardly against the valve spool spring 233 and drives the sealing element 232 to again close the hole 221. Characteristics of the valve body spring (e.g., spring constant (elasticity), length, etc.) may be set based upon the desired decompression value of air pressure. As such, the second valve component 2 automatically seals after decompression. When the air pressure of the air chamber 42 is lower than the decompression value, the elastic force of the valve body spring 219 causes the valve body 22 and the valve spool component 23 to move away from the thimble 218.

In the open state of the second valve component 2, the pressure in the air chamber 42 of the inflatable product 4 increases, and valve body 22 and the valve spool component 23 move towards the thimble 18 under the increased air pressure. When the thimble 218 abuts against the sealing element 232, the valve spool spring 233 is compressed. When the air pressure of the air chamber 42 is less than or equal to the decompression value, the thimble 218 abuts against the sealing element 232, thereby sealing the hole 221. When the air pressure of the air chamber is greater than the decompression value, the valve body 22 keeps moving, the valve spool component 23 stops moving by the limiting of the thimble 218, so that the valve spool component 23 separates from the valve body 22, the decompression hole 217 is connected to the air chamber 42 to exhaust air out from the air chamber 42 of the inflatable product 4 (i.e., automatically decompressing).

During automatic decompression, the valve spool component 23 is continuously abutted against, and has its upward movement limited by, the thimble 218. As such, the valve spool component 23 does not move up and down under flowing air, so that the service life of the valve spool component 23 may be effectively lengthened.

Therefore, when the air pressure of the air chamber 42 is lower than the decompression value, the valve spool component 23 is forced upwardly by the valve spool spring 233 and the air pressure of the air chamber 42, such that the sealing element 232 abuts against the valve body 22 and seals the hole 221. When the air pressure of the air chamber 42 is greater than the decompression value, due to the relatively weak elastic force of the valve spool spring 233, the sealing element 232 is configured to open quickly for decompression (i.e., has a quick response time). Furthermore, when the air pressure of the air chamber 42 reduces to below the decompression value, as the elastic force of the valve spool spring 233 is far lighter than the elastic force of the valve body spring 219, the valve spool spring 233 resets quickly under the action of the valve body spring 219, thus stopping decompressing quickly and reducing the likelihood of over decompressing air in the air chamber 42.

In the illustrative embodiment shown in FIGS. 1 and 2, an air valve cover 3 is inserted in the air valve 111. The air valve cover 3 includes an air outlet 31, which is connected to the decompression hole 217 by the internal passageway 112 of the upper body 11. Air is configured to selectively flow out of the decompression hole 217 and then the air outlet 31 by operation of the decompression valve component 2. More particularly, the second or decompression valve component 2 includes decompression passage 210 selectively connecting the air chamber 42 to atmosphere 102. The decompression passage 210 illustratively extends from the air chamber 42, through the internal chamber 121 of the lower body 12, the internal chamber 211 of the valve base 21, the decompression holes 217, and through the internal passageway 112 of the upper body 11 to the air outlet 31.

In the illustrative embodiment shown in FIG. 5, the outer wall 41 of the air chamber 42 is illustratively positioned in an abutting relationship between the upper body 11 and the lower body 12. More particularly, the outer wall 41 is illustratively sealed with the upper body 11 and the lower body 12 by the abutting force between the upper body 11 and the lower body 12.

Figure 6:
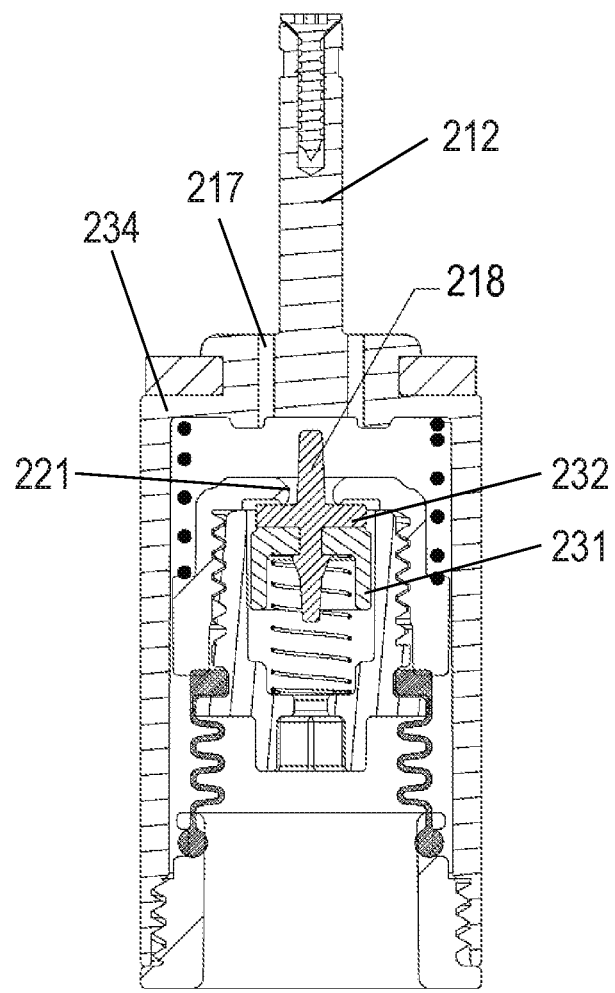
FIG. 6 is a longitudinal cross-sectional view of a further illustrative valve assembly of the present disclosure, showing a different configuration limit portion.

It should be noted that, the limit portion (e.g., the thimble 218) of the illustrative embodiment of FIGS. 1-5 is shown disposed at the top end of the internal chamber 211. More particularly, the thimble 218 may extend downwardly from the upper wall 220 of the valve body 22 (FIG. 4). As needed, the thimble 218 can be disposed at other positions for releasing the sealing relationship of the valve spool component 23 and the valve body 22 when the air pressure increases. With reference to the illustrative embodiment of FIG. 6, the thimble 218 may extend upwardly from the valve spool component 23.

Figure 7:
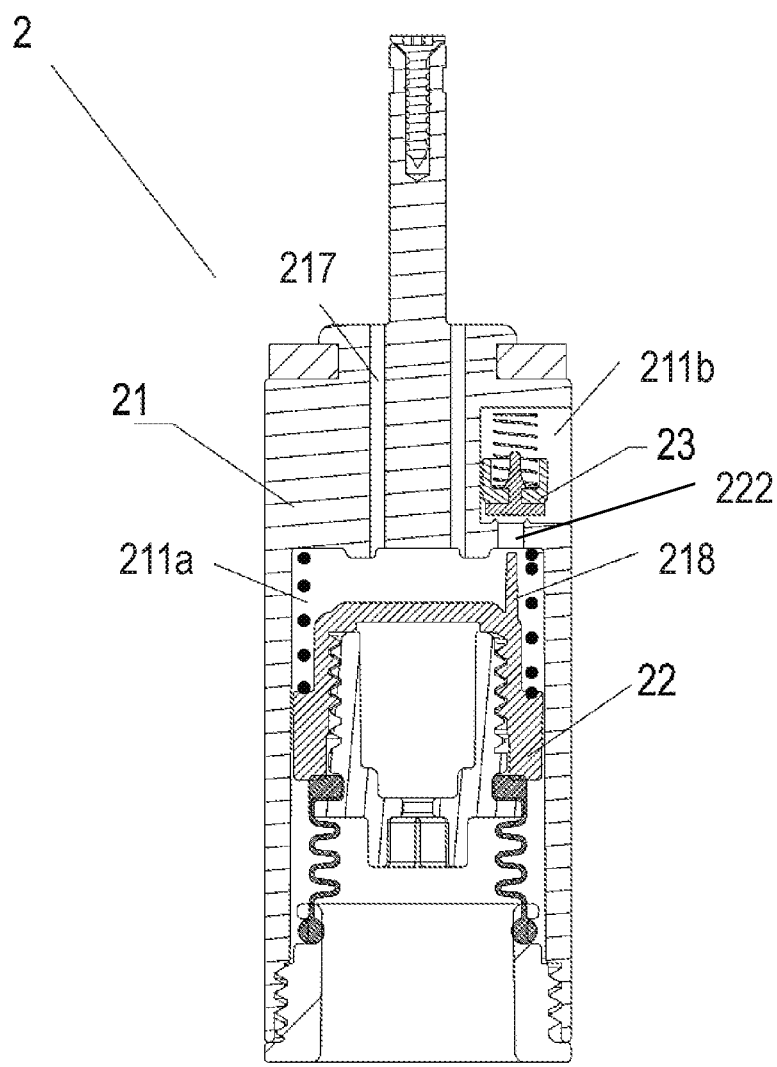
FIG. 7 is a longitudinal cross-sectional view of a further illustrative valve assembly of the present disclosure, showing a different configuration decompression valve component.

Referring now to the illustrative embodiment of FIG. 7, the second or decompression valve component 2 comprises valve base 21, valve body 22 and valve spool component 23.

Valve body 22 is received within first chamber 211a of valve base 21, while the valve spool component 23 is received within second chamber 211b. The first chamber 211a and second chamber 211b are fluidly connected with each other, via a connecting passageway 222, and with the internal chamber 121 (see FIG. 2). More particularly, one end of the second chamber 211b is fluidly connected to the air chamber 42 via the internal chamber 121, and the valve spool component 23 is disposed in the second chamber 211b. The valve spool component 23 abuts against and closes the connecting portion between the first chamber 211a and the second chamber 211b by the air pressure in the air chamber 42.

The valve body 22 is disposed in the first chamber 211a, one end of the first chamber 211a is connected to the internal receiving chamber 121, so that the valve body 22 moves in the first chamber 211a by the influence of the air pressure in the air chamber 42. The other end of the first chamber 211a is disposed with decompression holes 217 connected to the air valve 111. The decompression holes 217 and the air chamber 42 are separated by the valve body 22. The valve body 22 is further disposed with a limit portion 218, such as a post or thimble. More particularly, the limit portion 218 may comprise a thimble disposed at the top end of the internal wall of the valve body 22 along the length direction of the valve body 22.

When air pressure in the air chamber 42 increases, the valve body 22 moves toward the valve spool component 23 by the air pressure. When air pressure in the air chamber 42 reaches the decompression value, the limit portion 218 abuts against the valve spool component 23. When the air pressure in the air chamber 42 is higher than the decompression value, the valve spool component 23 moves away from the connecting passageway 222 of the first chamber 211a and the second chamber 211b under the limit action of the limit portion 218. The decompression hole 217 connects the second chamber 211b and the air chamber 42 to exhaust in the air chamber 42 out from the valve assembly 100.

Figure 8:
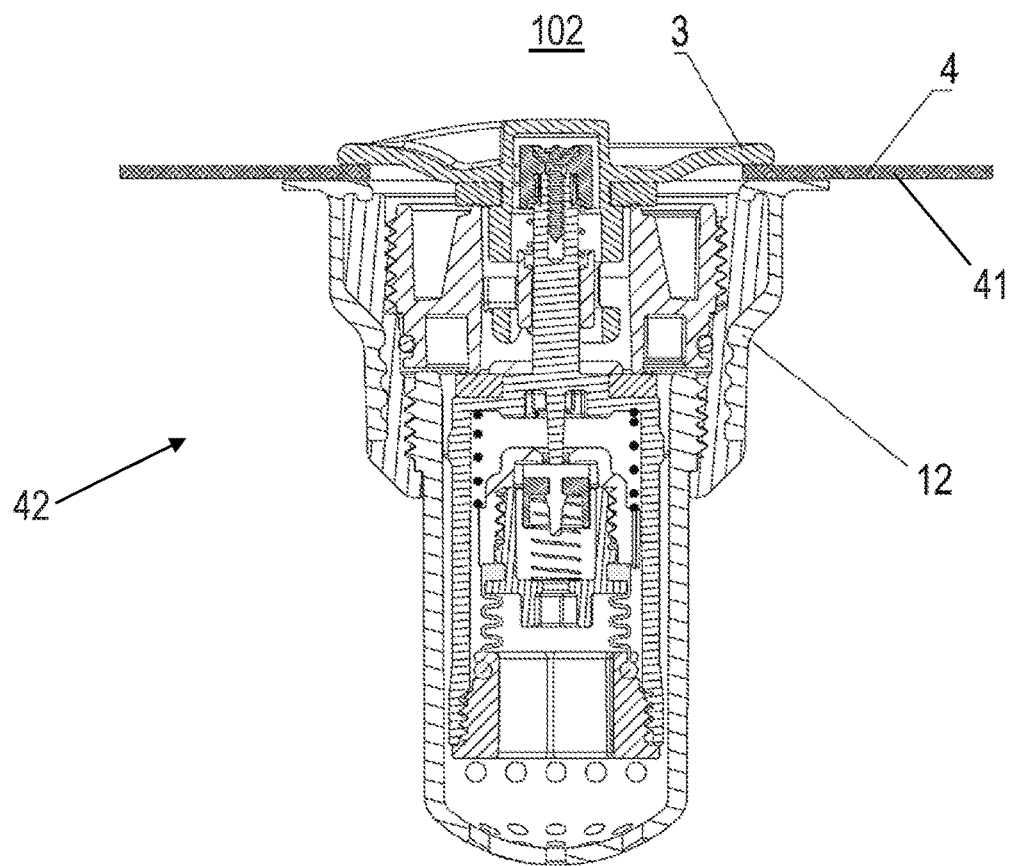
FIG. 8 is a longitudinal cross-sectional view of another illustrative valve assembly of the present disclosure, showing an external wall of the air chamber sealingly coupled to the outer body.

As shown in the illustrative embodiment of FIG. 8, external wall 41 of the air chamber 42 includes a lower surface sealed to the upper surface of the lower body 12 by high-circle welding or gluing. The external wall 41 of the air chamber 42 includes an upper surface illustratively sealed by the abutting force between the air valve cover 3 and the lower body 12. In other illustrative embodiments, the air valve cover 3 does not apply an abutting force to lower body 12 and, in fact, has holes to allow air to escape when the over pressure condition occurs. The remaining components of this illustrative embodiment are substantially similar to those of the illustrative embodiment of FIGS. 1-5.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An air valve assembly comprising:
   an air valve component including an outer body defining an internal receiving chamber, and an air valve in fluid communication with the internal receiving chamber, the outer body including an air hole fluidly connecting the internal receiving chamber and an air chamber of an inflatable product;
   a decompression valve component received within the internal receiving chamber and supported for longitudinal movement within the internal receiving chamber between a sealed state and an open state, the decompression valve component sealing the air valve of the air valve component from the air hole of the outer body in the sealed state, and the decompression valve component fluidly connecting the air valve of the air valve component and the air hole of the outer body in the open state;
   wherein the decompression valve component includes a decompression passage fluidly connecting the air chamber and atmosphere, a sealing portion configured to close the decompression passage in the sealed state, and a limit portion operably coupled with the sealing portion; and
   wherein when air pressure within the internal receiving chamber is greater than a decompression value, the sealing portion and the limit portion move relative to each other, and the sealing portion abuts the limit portion to move the decompression valve component from the sealed state to the open state.

2. The air valve assembly of claim 1, wherein:
   the sealing portion comprises a valve base defining an internal chamber, a valve body supported for longitudinal movement within the internal chamber of the valve base, and a valve spool component supported within the valve body for longitudinal movement relative to the valve body between the sealed state and the open state;
   a first end of the internal chamber of the valve body is fluidly connected to the air chamber by the air hole of the outer body, and a second end of the internal chamber of the valve body includes a decompression opening for fluidly connecting the internal chamber with atmosphere;
   the valve body abuts against the valve spool component in the sealed state of the decompression valve component;
   when air pressure in the air chamber reaches the decompression value, the limit portion abuts against the valve spool component; and
   when the air pressure in the air chamber is greater than the decompression value, the valve spool component is prevented from moving by engagement with the limit portion, the valve spool component separates from the valve body, and the decompression opening is fluidly connected to the air chamber to exhaust air from the air chamber to atmosphere.

3. The air valve assembly of claim 2, wherein the limit portion comprises a thimble extending downwardly from the second end of the internal chamber of the valve base.

4. The air valve assembly of claim 2, wherein the outer body of the air valve component includes an upper body and a lower body coupled to the upper body, the air valve being received within the upper body, the internal receiving chamber being defined by the lower body, and the lower body including a side wall, a bottom wall, and a plurality of the air holes supported within the side wall and the bottom wall and fluidly connecting the internal receiving chamber and the air chamber of the inflatable product.

5. The air valve assembly of claim 4, further comprising a valve rod extending upwardly from the valve base and extending through a passage in the upper body, a seal positioned intermediate the valve base and the upper body, and an air valve spring operably coupled to the valve rod to bias the valve base upwardly toward the upper body.

6. The air valve assembly of claim 4, further comprising a valve body spring received within the internal chamber of the valve base, a first end of the valve body spring engaging an upper wall of the internal chamber of the valve base, and a second end of the valve body spring engaging the valve body, wherein the valve body spring biases the valve body and the valve spool component away from the limit portion when the air pressure of the air chamber is lower than the decompression value.

7. The air valve assembly of claim 6, further comprising a valve spool spring including a first end engaging the valve spool component, and a second end engaging the valve body, wherein the valve spool spring is compressed when the limit portion abuts against the valve spool component and the valve spool spring resets and drives the valve spool component toward the decompression hole when the air pressure in the air chamber is lower than the decompression value.

8. The air valve assembly of claim 4, wherein the air chamber includes an outer wall disposed between the upper body and the lower body.

9. The air valve assembly of claim 8, further comprising an air valve cover operably coupled to the air valve, the air valve cover including an air outlet fluidly coupled to the decompression opening by the upper body.

10. The air valve assembly of claim 1, wherein:
the sealing portion comprises a valve base defining a first chamber, a second chamber, and a connecting passageway fluidly connecting the first chamber and the second chamber, a valve body supported for movement within the first chamber of the valve base, a valve spool component supported for movement within the second chamber of the valve base, the valve spool component abuts against and closes the connecting passageway by air pressure in the air chamber;
a first end of the valve base is fluidly connected to the first chamber, such that the valve body is configured to move in the first chamber by influence of air pressure in the air chamber;
a second end of the valve base includes a decompression opening for fluidly connecting the air valve, the valve body separating the decompression opening and the air chamber;
a limit portion supported by the valve body, when air pressure in the air chamber increases, the valve body moves to the valve spool component by the air pressure;
when the air pressure in the air chamber reaches the decompression value, the limit portion abuts against the valve spool component; and
when the air pressure in the air chamber is greater than the decompression value, the valve spool component moves away from the connecting portion of the first chamber and the second chamber in response to engagement of the limit portion, the decompression opening connects the second chamber and the air chamber to exhaust air from the air chamber to atmosphere.

11. The air valve assembly of claim 10, wherein the limit portion comprises a thimble supported by an upper end of the of the valve body.

12. An air valve assembly comprising:
an outer body defining an internal receiving chamber and having a plurality of air holes fluidly coupling the internal receiving chamber and an air chamber of an inflatable product;
an air outlet supported by the body and configured to provide selective communication between the air chamber and atmosphere;
an air valve device supported by the outer body and fluidly coupled to the air chamber through the air holes of the outer body and the internal receiving chamber, the air valve device including a valve rod and an air valve seal supported by the valve rod, the valve rod movable between a sealed state and an open state, wherein the air valve seal cooperates with the outer body to block air flow in the sealed state, and the air valve seal is in spaced relation to the outer body to define a passageway between the air valve seal and the outer body in the open state, the valve rod being biased toward the sealed state; and
a decompression valve device supported by the outer body and fluidly coupled to the air chamber through the air holes of the outer body and the internal receiving chamber, the decompression valve device including a valve base received within the internal receiving chamber, the valve base defining an internal chamber extending between a first end and a second end, the first end including a decompression opening in fluid communication with the air outlet, and the second end fluidly coupled to the air chamber through the air holes of the outer body and the internal receiving chamber, a valve body and a valve body seal supported within the internal chamber of the valve base, the valve body supported for movement relative to the valve body seal between a sealed state and an open state, wherein air pressure inside the air chamber less than or equal to a decompression value causes the valve body and the valve body seal to be in the sealed state where air flow is blocked through the decompression opening, and air pressure inside the air chamber greater than a decompression value causes the valve body and the valve body seal to be in the open state where air flow is permitted through the decompression opening.

13. The air valve assembly of claim 12, wherein the air valve device further includes a spring operably coupled to the valve rod to bias the air valve seal longitudinally toward the outer body.

14. The air valve assembly of claim 12, wherein the decompression valve device further includes a valve body spring positioned intermediate the valve base and the valve body to oppose air pressure within the internal chamber of the valve base from the air chamber.

15. The air valve assembly of claim 14, wherein the decompression valve device further includes a valve spool supporting the valve body seal, and a valve spool spring to bias the valve body seal into sealing engagement with the valve body.

16. The air valve assembly of claim 15, wherein the valve spool spring includes a first end engaging the valve spool and the valve body seal, and a second end engaging the valve body, wherein the valve spool spring is compressed when a thimble abuts against the valve body seal, and the valve spool spring resets and drives the valve body seal toward the decompression hole when the air pressure in the air chamber is lower than the decompression value.

17. The air valve assembly of claim 12, wherein the decompression valve device further includes a limit portion operably coupled with the valve body seal, wherein when air pressure within the internal receiving chamber is greater than a decompression value, the valve body seal and the limit portion move relative to each other, and the valve body seal abuts the limit portion to move the decompression valve component from the sealed state to the open state.

18. The air valve assembly of claim 17, wherein when the air pressure in the air chamber is greater than the decompression value, the valve body seal separates from the valve body, and the decompression opening is fluidly connected to the air chamber to exhaust air from the air chamber to atmosphere.

19. The air valve assembly of claim 18, wherein the limit portion comprises a thimble disposed extending downwardly from an upper end of the internal chamber of the valve base.

20. The air valve assembly of claim 12, wherein the outer body of the air valve component includes an upper body and a lower body coupled to the upper body, the air valve being received within the upper body, the internal receiving chamber being defined by the lower body, and the lower body includes a side wall and a bottom wall, a plurality of the air holes supported within the side wall and the bottom wall.

21. The air valve assembly of claim 20, further comprising an air valve spring operably coupled to the valve rod to bias the valve base upwardly toward the upper body, wherein the air valve seal is positioned intermediate the valve base and upper body.

22. The air valve assembly of claim 20, further comprising a valve body spring received within the internal chamber of the valve base, a first end of the valve body spring engaging an upper wall of the internal chamber of the valve base, and a second end of the valve body spring engaging the valve body, wherein the valve body spring biases the valve body and the valve body seal away from a limit portion when the air pressure of the air chamber is lower than the decompression value.

23. The air valve assembly of claim 20, wherein the air chamber includes an outer wall disposed between the upper body and the lower body.

24. The air valve assembly of claim 20, further comprising an air valve cover operably coupled to the air valve, the air valve cover including an air outlet fluidly coupled to the decompression opening by the upper body.

25. An air valve assembly comprising:
an outer body defining an internal receiving chamber and having a plurality of air holes fluidly coupling the internal receiving chamber and an air chamber of an inflatable product;
an air outlet supported by the body and configured to provide selective communication between the air chamber and atmosphere;
an air valve device supported by the outer body and fluidly coupled to the air chamber through the air holes of the outer body and the internal receiving chamber;
the air valve device including:
an air valve seal movable between a sealed state and an open state,
wherein the air valve seal cooperates with the outer body to block air flow in the sealed state, and the air valve seal is in spaced relation to the outer body to define a passageway between the air valve seal and the outer body in the open state; and
a decompression valve device supported by the outer body and fluidly coupled to the air chamber through the air holes of the outer body and the internal receiving chamber;
the decompression valve device including:
a valve base received within the internal receiving chamber, the valve base defining an internal chamber extending between a first end and a second end, the first end including an upper wall having a decompression opening in fluid communication with the air outlet, and the second end fluidly coupled to the air chamber through the air holes of the outer body and the internal receiving chamber,
a valve body supported within the internal chamber of the valve base, the valve body including an upper wall having a valve body opening in fluid communication with the decompression opening,
a valve spool and a valve body seal operably coupled to the valve body, the valve body seal supported by the valve spool and configured to selectively block the valve body opening,
a valve body spring received within the internal chamber of the valve base and biasing the valve body away from the upper wall of the valve base and toward the valve body seal, the valve body supported for movement relative to the valve body seal between a sealed state and an open state,
a valve spool spring to bias the valve body seal toward the valve body opening, and
a limit portion operably coupled with the valve body seal, wherein air pressure inside the air chamber less than or equal to a decompression value causes the valve body and the valve body seal to be in the sealed state where air flow is blocked through the valve body opening and the decompression opening, and air pressure inside the air chamber greater than a decompression value causes the valve body seal to abut the limit portion and move the valve body relative to the valve body seal from the sealed state to the open state where air flow is permitted through the valve body opening and the decompression opening.

* * * * *